US008160389B2

(12) United States Patent
Bissonnette et al.

(10) Patent No.: US 8,160,389 B2
(45) Date of Patent: Apr. 17, 2012

(54) METHOD FOR OVERLAPPING VISUAL SLICES

(75) Inventors: Charles Bissonnette, Snoqualmie, WA (US); Charles Parker, Sammamish, WA (US); Daniel Cook, Seattle, WA (US); Douglas Charles Shimonek, Sioux City, IA (US); William Hsu, Redmond, WA (US); Yin Li, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 12/179,575

(22) Filed: Jul. 24, 2008

(65) Prior Publication Data
US 2010/0021060 A1 Jan. 28, 2010

(51) Int. Cl.
G06K 9/20 (2006.01)
G06K 9/34 (2006.01)
(52) U.S. Cl. ......................................... 382/282; 382/173
(58) Field of Classification Search .................. 382/173, 382/180, 282, 284, 305, 312; 715/200, 250, 715/274
See application file for complete search history.

(56) References Cited

U.S. PATENT DOCUMENTS

| 5,692,185 | A | * | 11/1997 | Nilsen et al. .................. 707/814 |
|---|---|---|---|---|
| 6,061,420 | A | | 5/2000 | Strong et al. |
| 6,230,174 | B1 | | 5/2001 | Berger et al. |
| 7,209,779 | B2 | | 4/2007 | Kaufman et al. |
| 7,269,299 | B2 | | 9/2007 | Schroeder |
| 7,337,398 | B1 | * | 2/2008 | Thrall et al. .................. 715/210 |
| 7,657,100 | B2 | * | 2/2010 | Gokturk et al. ............... 382/209 |
| 2002/0090119 | A1 | | 7/2002 | Saito et al. |
| 2003/0123714 | A1 | | 7/2003 | O'Gorman et al. |
| 2006/0079755 | A1 | | 4/2006 | Stazzone et al. |
| 2007/0253491 | A1 | | 11/2007 | Ito et al. |

OTHER PUBLICATIONS

"Adobe 10 Illustrator Version 10", Printed on Nov. 28, 2001, Adobe Systems Incorporated, San Jose, CA 95110-2704 USA, 7 Pages.
"Change What Appears in a Slice", http://msdn.microsoft.com/en-us/library/cc375011.aspx, 2008.
Gering, et al., "An Integrated Visualization System for Surgical Planning and Guidance Using Image Fusion and an Open MR", Journal of Magnetic Resonance Imaging, vol. 13, Year: 2001, pp. 967-975.
"Slicing the Image in Photoshop", http://safari.oreilly.com/0201710161/ch15lev1sec3.

* cited by examiner

Primary Examiner — Kanjibhai Patel
(74) Attorney, Agent, or Firm — Microsoft Corporation

(57) ABSTRACT

Image editing tools are commonly used to assist with manipulating and saving visual compositions. Many image editing tools provide slicing functionality to create images slices (sub-images) of the visual composition. As provided herein, a slice representation of a visual composition is defined by an arbitrarily chosen set of coordinates within the visual composition. This slice region may be defined independent of other slice regions (e.g. the slice region may or may not overlap, abut, etc. other slice regions). The slice representation comprises the slice region and one or more objects or portions thereof within the slice region. Slice representations may also comprise overlapping objects and/or slice region coordinates. Objects may be manipulated within a slice representation without affecting that object within other slice representations.

20 Claims, 13 Drawing Sheets

METHOD FOR OVERLAPPING VISUAL SLICES

BACKGROUND

Image editing tools are commonly used for creating and manipulating visual compositions (e.g. bitmap graphics, vector graphics, web-based graphics, etc.). Slicing functionality may be a feature of many image editing tools. Slicing functionality allows a user to slice or cut up a visual composition into an image slice (sub-image). Image slicing is often used to slice a visual composition into multiple images slices. The images slices may later be used within a webpage, graphical run-time environment, mobile application, etc. Performance in displaying a visual composition is improved by progressively loading images slices. An example is where a webpage graphic is sliced into a series of image slices in a tile format. The webpage may then load the image slices until the entire webpage graphic is loaded, instead of loading the entire webpage graphic at once.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure relates to creating a slice representation of a visual composition. A visual composition may be a graphical image, a vector based image, a bitmap, and/or any other visual representation of data within a computing environment. The slice representation comprises a slice region and at least one object or portion thereof within the slice region. The slice region is defined by a set of coordinates within the visual composition. The set of coordinates may be user defined coordinate points, ordered coordinate points, a visual area encompassing user selected objects, or any other set of coordinates.

Once the slice region is defined, a determination is made as to which objects or portions thereof are within the slice region of the visual composition. The slice representation may comprise objects that are completely within the slice region and/or objects that are partially within the slice region. The portions of an object that are not within the slice region are clipped out. Finally, a slice representation is generated comprising the slice region and objects or portions thereof within the slice region.

The slice region may be defined in an arbitrary manner. That is, the slice region may or may not overlap and/or abut another slice region. The slice region may have a configuration (e.g. size, position, etc.) independent of other slice regions, objects within the visual composition, and/or slice representations. Objects within a slice representation are also independent of the same or other objects within another slice region and/or visual composition. Objects or portions thereof may be modified within a slice representation without affecting the same object within another slice region or the visual composition.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
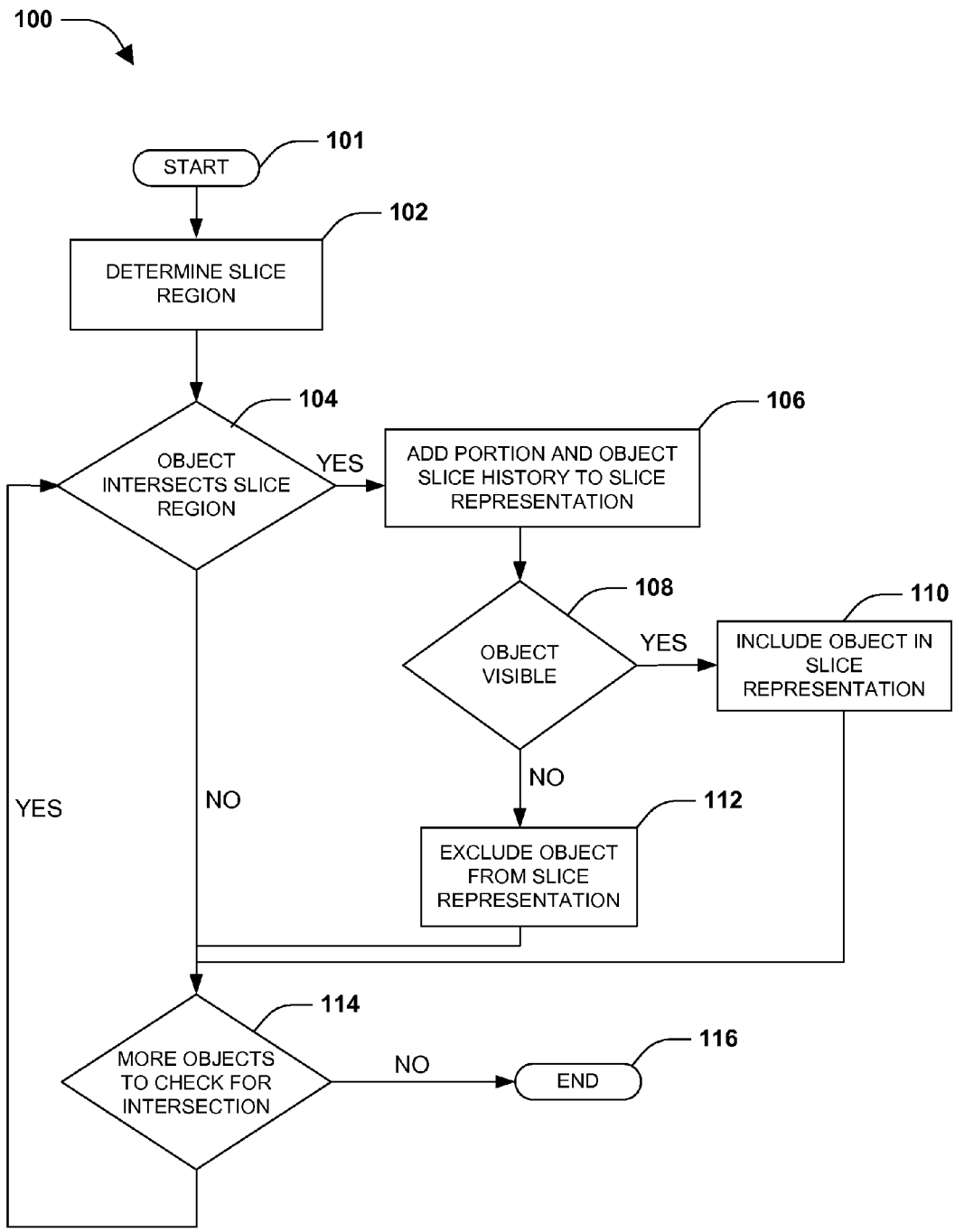
FIG. 1 is an illustration of a flow diagram for generating a slice representation within a visual composition.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many image editing tools provide slicing functionality when editing a visual composition. The slicing functionality allows a user to segment a visual composition into several non-overlapping slices (e.g. bitmap images). Current slicing techniques create slices abutted together, forming a series of tiles over the visual composition. The slices may be exported and used to populate a webpage using HTML or any other layout mechanism.

Slicing functionality is often used for improving the performance of displaying a webpage. Image slices (e.g., sub-sections of the whole visual composition) may be progressively loaded until the whole visual composition is displayed. Many modern web-browsers now support image transparency. This allows for multiple visual images (image slices) in the same physical location of the webpage. Displaying overlapping visual images may extend to any graphical run-time environment, such as desktop or mobile applications.

Conventional slice techniques have limitations in the placement and size of images slices. For example, a new image slice may be limited by a previous image slice. The new image slice may not overlap and/or must abut a previous image slice. As provided herein, however, a slice region (e.g. the boundaries of an image slice) can be defined or acquired arbitrarily. That is, a slice or portion of an image can be acquired regardless of: the boundaries or size of the slice region, the location of the slice region relative to one or more previously acquired slice regions, the object(s) in the slice region, the object(s) in the slice region relative to object(s) in one or more previously acquired slice regions, etc. For example, a slice region may be larger (or smaller) than a previously acquired slice region, may overlap some, all or none of a previously acquired slice region, may comprise some all or none of an object in an image, may comprise some all or none of an object that was also comprised within a previously acquired slice region, etc. The ability to create overlapping visual slices of a visual composition provides an efficient method for creating visual images that may be used within the same physical location of a graphical runtime (e.g. website).

An illustration of the benefit of creating overlapping slices compared to non-overlapping and/or abutting (tile layout) slices is where a visual composition corresponds to the visual layout of a webpage. The webpage corresponds to an online store where a visitor may click a purchase button to buy an item from the online store. During development of the visual images that will be used within the webpage, a designer may draw a purchase button object within the visual composition. The designer may select a first slice that comprises the purchase button object. The designer can manipulate the properties (e.g. highlighted color, font, visibility) of the purchase button object. The original visual composition is unaffected by the manipulation of the properties of the purchase button object. The designer may then select a second slice that comprises the purchase button object (the designer is not limited to selecting a second slice of the same area, but may arbitrarily select any region/place and size within the visual composition regardless of other slice regions). The second slice is unaffected by the changes made to the first slice (the purchase button object has the same properties as it had within the original visual composition).

Any changes to the first slice, second slice, and/or objects comprised within do not affect one other and/or the visual composition. The user may then export the first slice and/or the second slice. For example, the first slice may comprise the purchase button object with a highlighted property (e.g. yellow background highlight). The second slice may comprise the purchase button object without a highlight property (e.g. background is grey). The first slice and/or second slice may be exported as transparent image files (e.g. xaml) that may be used within the webpage. The first slice and the second slice may be overlapped within the webpage. The first slice, with the purchase button object having a highlighted property, is displayed when a user of the webpage moves the mouse over the purchase button object. The second slice, with the purchase button having no highlighted property, is displayed when the user of the webpage has the mouse in a location other than over the purchase button object.

An implementation for creating an overlapping visual slice may comprise a user control within an image editing tool (e.g. software program). The user control may allow a user to select an arbitrary (e.g. any set of coordinates regardless of other slice region locations, unaffected by other slice region locations, etc.) location (e.g. set of coordinates, region encompassing a selection of objects, ordered set of coordinates, etc.) within the visual composition as a slice region. A slice representation may be created to represent the slice region and intersecting portions of an object within the slice region.

It will be appreciated that "an object" as provided herein (e.g., in the claims) may be interpreted to cover one or more objects. Additionally, "a portion" as used herein is meant to comprise anywhere between 0 and up to and including 100 percent of an item (object). For example, a portion of an object may be interpreted to comprise the entire object as well as anything less than all of an object (e.g., if the object is an animal, then a portion of the object comprises the entire animal as well as merely a leg of the animal). A portion may also comprise more than one portion of an object that intersects a slice region. For example, a portion of an animal object may comprise one portion representing a leg of an animal that intersects a slice region as well as one portion representing a head of the same animal that intersects the slice region.

The slice representation may be presented to a user through a preview window of the user control. The user control may allow a user to manipulate the contents (e.g. slice region, objects, etc.), of the slice representation and the properties (e.g. background color, preview visibility, font, inclusion for export, etc.) of the contents.

A slice operation may be a modification of coordinates of a slice region; removal/addition of objects from the slice region; modification of the visibility property of objects within the slice region; modification of the inclusion property of objects within the slice region, etc. If a slice operation is performed on the slice representation, then an object slice history may be kept. An object slice history may also be kept when a slice representation is created.

The purpose of the object slice history functionality is to retain the properties of objects and/or portions of objects within the slice representation. One method to retain the properties of objects is to retain slice operations that modify the slice representation and/or objects within the slice representation. If an object is removed from the slice region and/or slice representation, then the object slice history will continue to retain the slice operations that modified the object. Once the object is moved out of the slice region, the object properties may be modified to a setting different from what the object's properties where when it was within the slice region. If the object is moved back into the slice region (the slice representation now comprises the object), then the object slice history may render the object and/or restore the properties of the object corresponding to the retained slice operations that were previously applied to the object. The object will comprise the same properties and will be rendered in the same original manner before the object was moved out of the slice region. Slice operations and/or property changes done when the object was outside the slice region may not be retained within the object and the original properties are restored.

Slice operations on objects within a slice representation do not affect the original visual composition and/or the same object comprised within another slice representation. Slice regions, objects, and/or slice representations are independent of other slice regions and/or the visual composition. There is no dependency on the state (properties) of objects on the visual composition or between different slice representations. This preserves the original appearance of the visual composition and other slice representations.

The user control may allow the user to export one or more slice representations as an export file (e.g. xaml, transparent image, bitmap graphic, vector graphic, etc.). The user control may exclude objects from the export file corresponding to an inclusion property. The inclusion property may be a separate property and/or may be based upon a visibility property of the object. The user may change the inclusion property to include and/or exclude objects of the slice representation from a corresponding export file. The export file may also comprise a transparency property of the visual image (slice representation).

For example, a user may design and sell landscape blueprints through a website. A landscape blueprint may comprise many variations that include and/or exclude objects (e.g. a fountain, a new pathway, a tree, etc.), corresponding to the price of the landscape blueprint. The landscape blueprints may be derived from the same overall visual composition. Within the visual composition, the user has the ability to create slice representations corresponding to the landscape blueprints. The slice representations may use the same slice region, but may exclude objects based upon the pricing of the landscape blueprint (e.g. less expensive landscape blueprint have less objects). The user may include and/or exclude objects of the slice representations without affecting another slice representation. This allows the user to create slice representations corresponding to the variation of the landscape blueprints. When objects are manipulated (e.g. excluded, included, properties change, etc.), other slice representations comprising the same object are unaffected. The user may then export the slice representations for use as landscape blueprints within the website. The slice representations correspond (e.g. is a visual image) to the landscape blueprints that the user sells within the website.

FIG. 1 illustrates a flow diagram 100 of an exemplary method for generating a slice representation within a visual composition. At 101, the method starts. At 102, a slice region is determined. The slice region may be defined as a region surrounding a user selected set of objects within the visual composition; a set of coordinate points within the visual composition; a set of ordered coordinates (e.g. connected in ascending order) within the visual composition; and/or any other method for designating a slice region within a visual composition. At 104, a decision is made as to whether an object intersects the slice region (e.g. the object comprises a portion that intersects the slice region). If an object intersects the slice region, then the portion of the object within the slice region and an object slice history is added to the slice representation, at 106.

At 108, a decision is made as to whether the object is visible (e.g. visibility set to TRUE). If the object is visible, then the object is included the slice representation, at 110. If the object is not visible, then the object and/or corresponding portion is excluded from the slice representation, at 112. Once the object and/or corresponding portion is included and/or excluded from the slice representation, then a decision is made, at 114, as to whether more objects are available to check for intersection within the slice region. If there are more objects to check for intersection, then the decision, at 104, is repeated. If there are no more objects to check for intersection, then the method ends, at 116. The final output is a slice representation comprising the slice region and the objects and/or portions that intersect within the slice region and have a corresponding visibility property (e.g. visibility set to TRUE).

Figure 2:
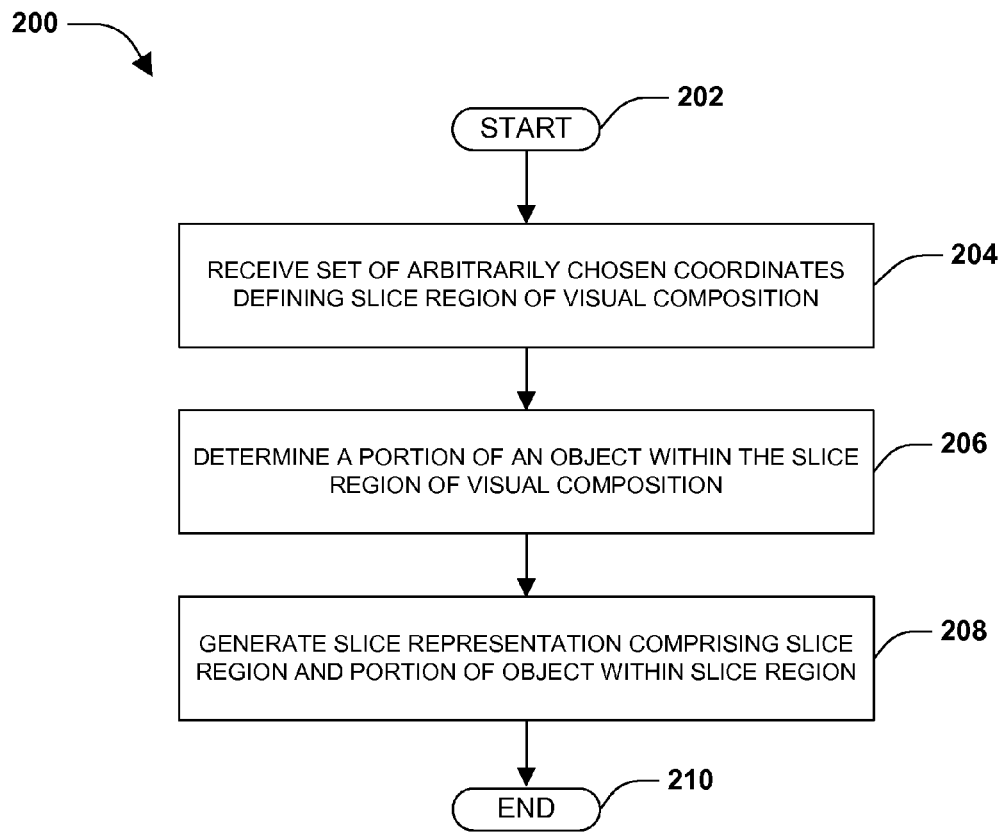
FIG. 2 is an illustration of an exemplary method for creating a slice representation of a visual composition.

One example of creating a slice representation of a visual composition is illustrated by an exemplary method 200 in FIG. 2. At 202 the method begins. At 204, a set of arbitrarily chosen coordinates defining a slice region of the visual composition is received. The set of arbitrarily chosen coordinates may be coordinates of a user selected region, an ordered set of coordinates, coordinates corresponding to a region around user selected objects, and/or any other act of designating coordinates. The coordinates are not bound or affected by any other coordinates of another slice representation. The coordinates may define the slice region in any position and size within the visual composition.

At 206, a portion of an object within (intersecting) the slice region of the visual composition is determined. Non-intersecting portions of an object that is partially within the slice region are clipped. The clipped portion is not included in the slice representation. At 208, the slice representation comprising the slice region and the portion of the object within the slice region is generated.

The slice representation may further comprise an object slice history. The object slice history may comprise slice operations that are applied to objects within the slice representation. The objects and/or portions of objects may be rendered according to the object slice history. For example, if a slice operation that changes the visibility of a circle object within the slice representation is applied to the circle object, then the slice operation is retained by the object slice history. If the circle object is move out of a slice region of the slice representation and later brought back into the slice region (becomes a part of the slice representation), then the circle object will be rendered according to the retained slice operations (e.g. the visibility change) comprised within the object slice history. At 210, the method ends.

Figure 3:
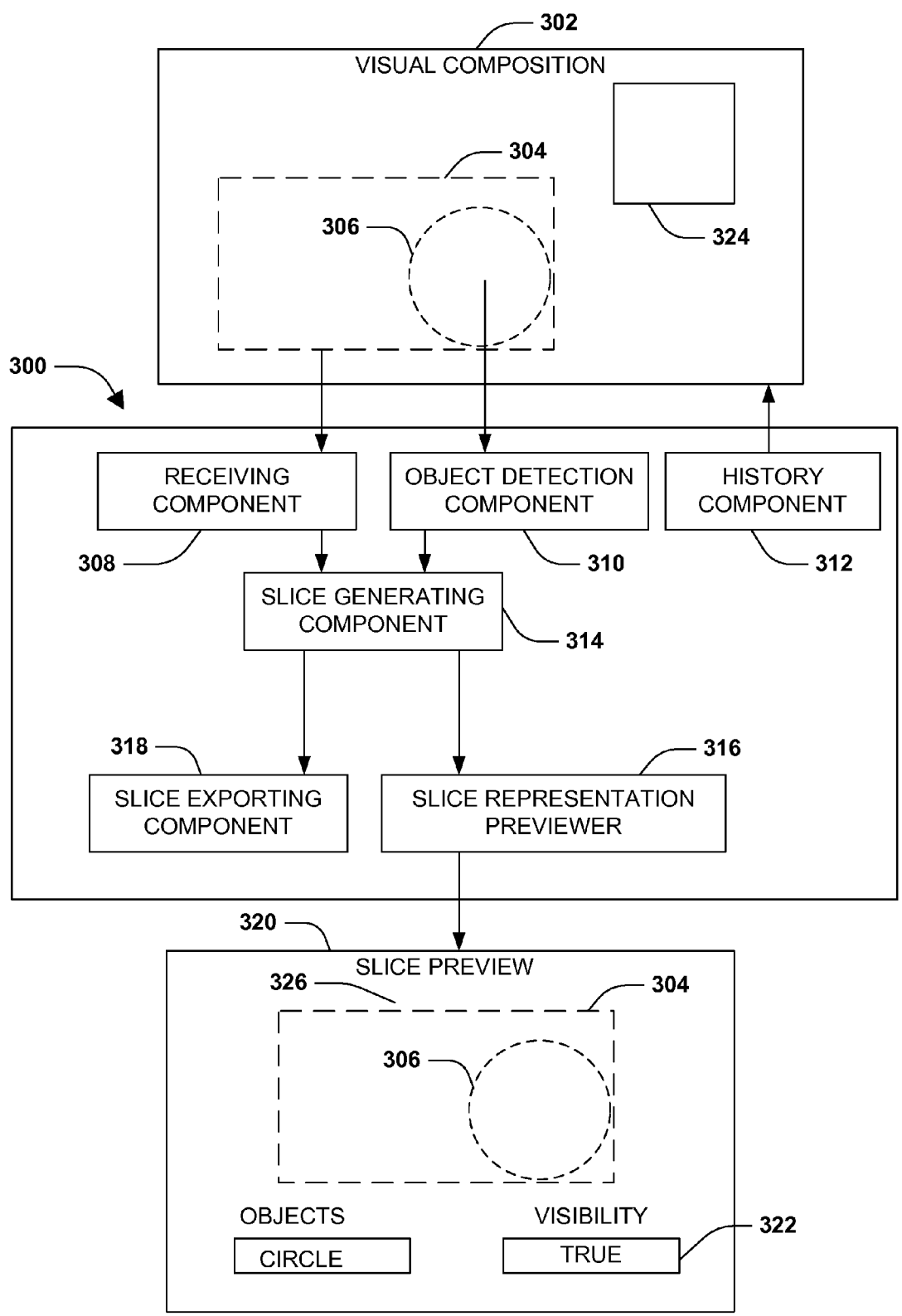
FIG. 3 is an illustration of a system configured to create a slice representation of a visual composition.

FIG. 3 illustrates an example of a system 300 configured to create a slice representation of visual composition 302. The system 300 comprises a receiving component 308, an object detection component 310, and a slice generating component 314. The system 300 further comprises a history component 312, a slice exporting component 318, and a slice representation previewer 316. The receiving component 308 is configured to receive a set of coordinates defining a slice region 304 of the visual composition 302. The receiving component 308 may be configured to receive a set of coordinates that define a slice region that at least partially overlaps a slice region of a second and/or any other slice region.

The system 300 is configured to generate slice representations that have a slice region that may or may not overlap other slice regions of other slice representations. The system 300 is not limited to slice regions that are abutted in a tile fashion or slice regions that may not overlap. The system 300 provides a user the ability to arbitrarily select any slice region without limitations based upon a previous slice region.

The object detection component 310 is configured to determine a portion of an object (a circle object 306) within the slice region 304 of the visual composition 302. The square object 324 is not within the slice region 304, and therefore, the square object 324 is not included in the slice representation. The slice generating component 314 is configured to generate the slice representation comprising the slice region 304 and the portion of the object (the circle object 306) within the slice region 304 of the visual composition 302.

The history component 312 may be configured to generate a slice object history of the slice representation. The slice object history may comprise a set of slice operations (e.g. modification of coordinate of the slice region, add/remove objects within the slice region, modifying properties of an object within the slice region, etc.) that have been applied to objects (the circle object 306) and or portions thereof within the slice region 304. The history component 312 may render an object within the slice representation according the object slice history. This may preserve the properties of an object and/or portion thereof (e.g. visibility, transparency, inclusion, font size, color, etc.) when the object and/or portion thereof is removed and then later returned to the slice region. The history component 312 may update object slice history when slice operations are applied to the slice representation.

The slice representation previewer 316 may be configured to present the slice representation. The slice representation may be presented within a slice preview 320 (e.g. through a user interface). The slice preview 320 may comprise a previewed slice representation 326, along with the slice region 304 and objects and/or portions of an object within (the circle object 306) within the slice region 304. The slice preview 320 may also comprise a list of the objects within the slice region 304 along with the respective properties of the objects. This allows a user to modify objects within the slice preview, such as, changing an objects visibility property 322 (visible within the slice preview 320 window) or inclusion property (included within the export file). The slice preview 320 may present a file size estimate based upon a file size estimate calculator.

The slice exporting component 318 is configured to generate at least one slice export file. The slice export file may be an image output, a vector based output, a text output, a video output, or any other type of export file. The slice exporting component 318 may be configured to comprise at least one slice representation within the slice export file. The slice export file may be translucent. Objects and/or portions thereof without an inclusion property (e.g. inclusion property is FALSE), but within the slice representation, may be excluded from the slice export file. The inclusion property may be based on the object's visibility property. An implementation of an export file is where the slice representation within the export file is used within a webpage to display the slice representation as a graphical image on the webpage. Multiple export files may be used to overlap graphical images onto the webpage.

Figure 4:
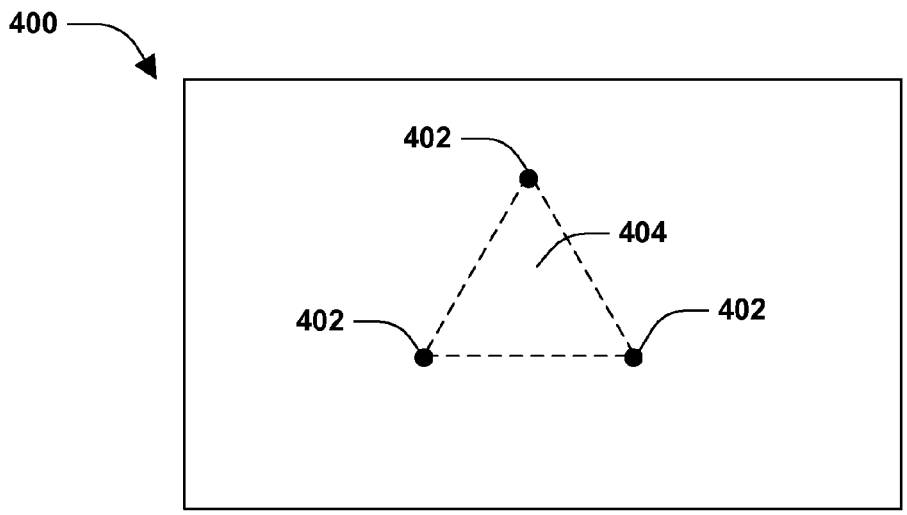
FIG. 4 is an illustration of defining a slice region of a visual composition.

FIG. 4 illustrates an example 400 of defining a slice region 404 of a visual composition. A set of coordinates 402 comprises three coordinate points within the visual composition that make up a polygonal region (triangle). The slice region is defined by the set of coordinates 402 of the polygonal region (triangle) within the visual composition.

Figure 5:
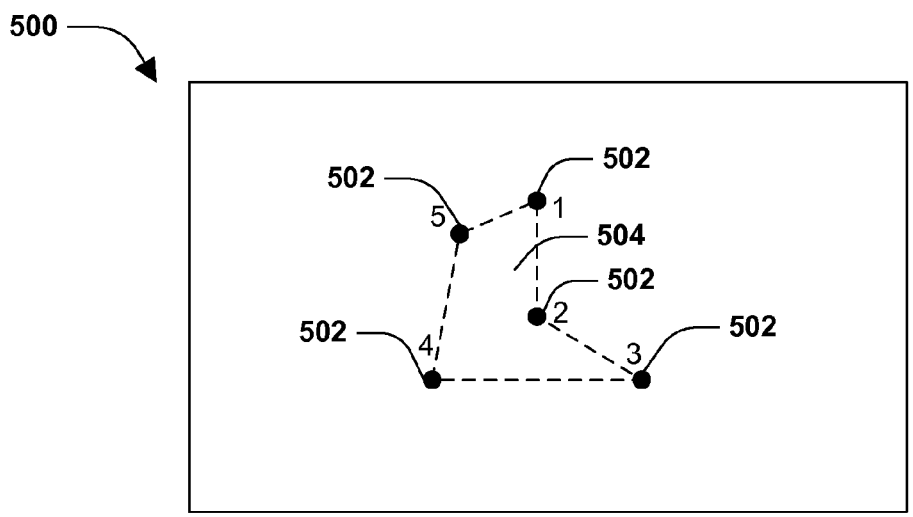
FIG. 5 is an illustration of defining a slice region of a visual composition.

FIG. 5 illustrates an example 500 of defining a slice region 504 of a visual composition. A set of coordinates 502 comprises five coordinate points within the visual composition that make up a polygonal region. The five coordinate points have a coordinate ordering. The slice region 504 is defined by the set of coordinates 502 based upon the coordinate ordering. The slice region may be different depending on the coordinate ordering, even though the same five coordinate points are used to define the slice region.

Figure 6:
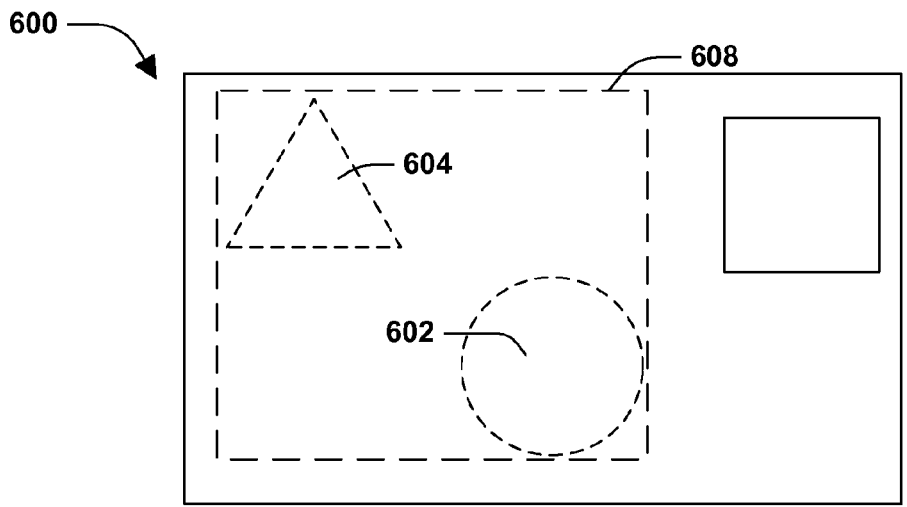
FIG. 6 is an illustration of defining a slice region of a visual composition.

FIG. 6 illustrates an example 600 of defining a slice region 608 of a visual composition. The slice region is defined based upon a set of selected objects and/or portions thereof within the visual composition. For example, a user may select a triangle object 604 and a circle object 602. The slice region 608 may be defined according to the coordinates of the selected objects. The coordinates may specify a visible region encompassing the selected objects.

Figure 7:
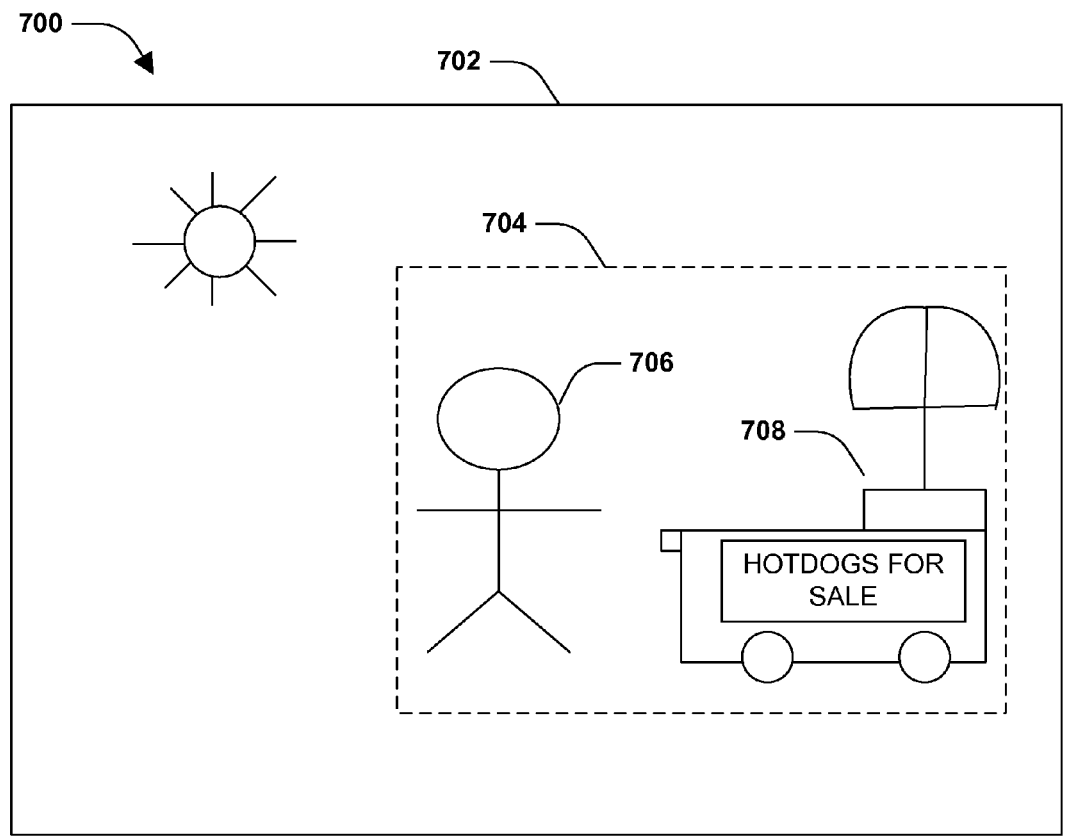
FIG. 7 is an illustration of an example of creating a slice representation of a visual composition.
Figure 7:
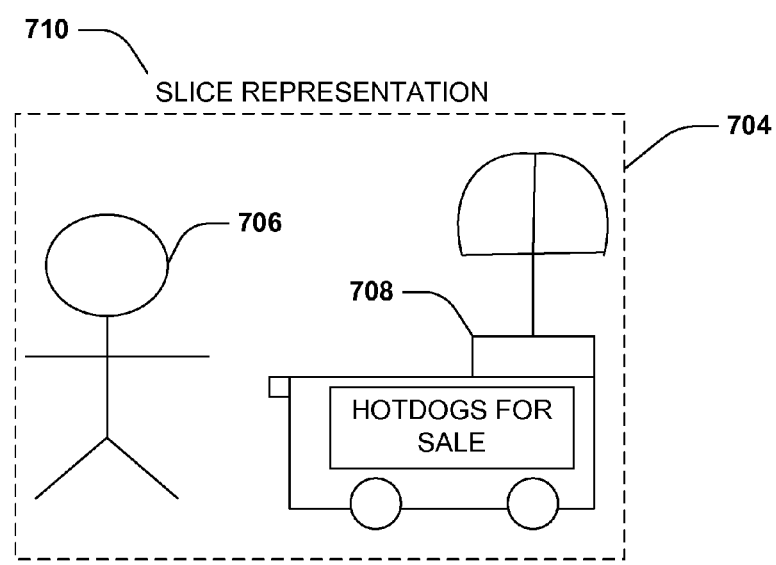

FIG. 7 illustrates an example 700 of creating a slice representation 710 of a visual composition 702. The slice representation comprises a slice region 704, a person object 706, and a hotdog stand object 708. In one example, a slice representation 710 is created by receiving a set of arbitrarily chosen coordinates defining the slice region 704. The set of arbitrarily chosen coordinates may be chosen through a slicing tool, a user specified region of the visual composition 702, a set of points that define a polygonal region, or any other method of choosing coordinates. The set of arbitrarily chosen coordinates may define any place and size within the visual composition 702, regardless of other slice representations and/or slice regions.

Upon receiving the set of arbitrarily chosen coordinates, a determination is made of portions of objects that intersect the slice region 704 of the visual composition 702. The person object 706 and the hotdog stand object 708 are within the slice region 704. Finally, the slice representation 710 is generated. The slice representation 710 comprises the slice region 704, the person object 706, and the hotdog stand object 708.

Figure 8:
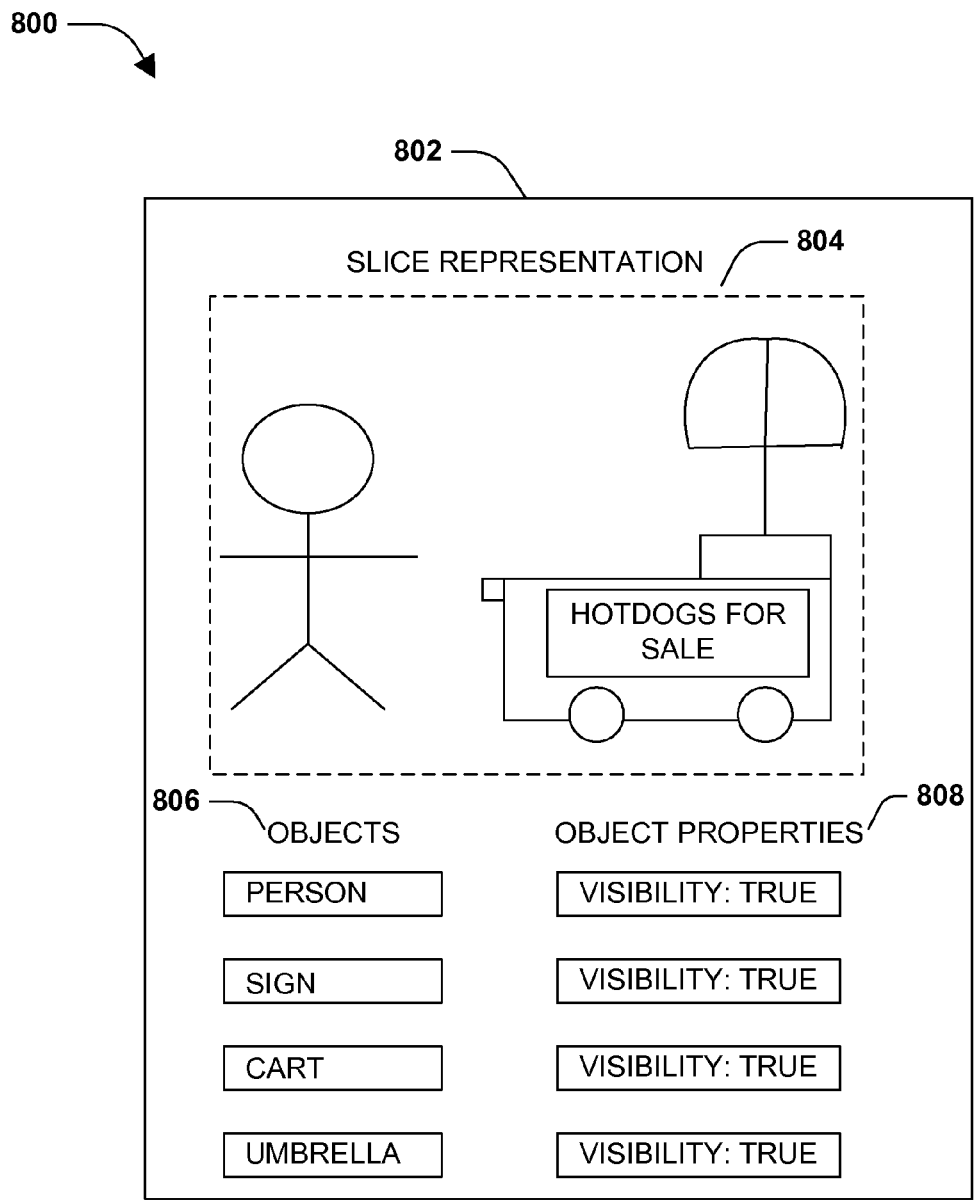
FIG. 8 is an illustration of an example of presenting a slice preview of a slice representation.

FIG. 8 illustrates an example 800 of presenting a slice preview 802 of a slice representation 804. The slice preview 802 may comprise the slice representation 804, a list of objects 806 within the slice representation, and a list of object properties 808. While the list of objects in the illustrated example is comprised of terms that help define the object, the objects may also be defined in other ways. For example, an image of the object may be displayed in the list of objects. The slice representation 804 may comprise a slice region and a portion (at least one portion) of an object (at least one object) within the slice region. A visibility property for the objects within the slice representation 804 is illustrated in example 800. It may be appreciated that any appropriate property of an object may be specified within the slice preview 802, such as, inclusion for export, font size, color, or any other property that an object may have.

A user has the ability to alter (e.g. perform a slice operation) object properties within the list of object properties 808 within the presentation of the slice preview 802. The slice representation 804 reflects object properties. If a user alters an object property, it will alter the slice representation 084, but will not affect that object within the visual composition and/or another slice representation within the visual composition.

Figure 9:
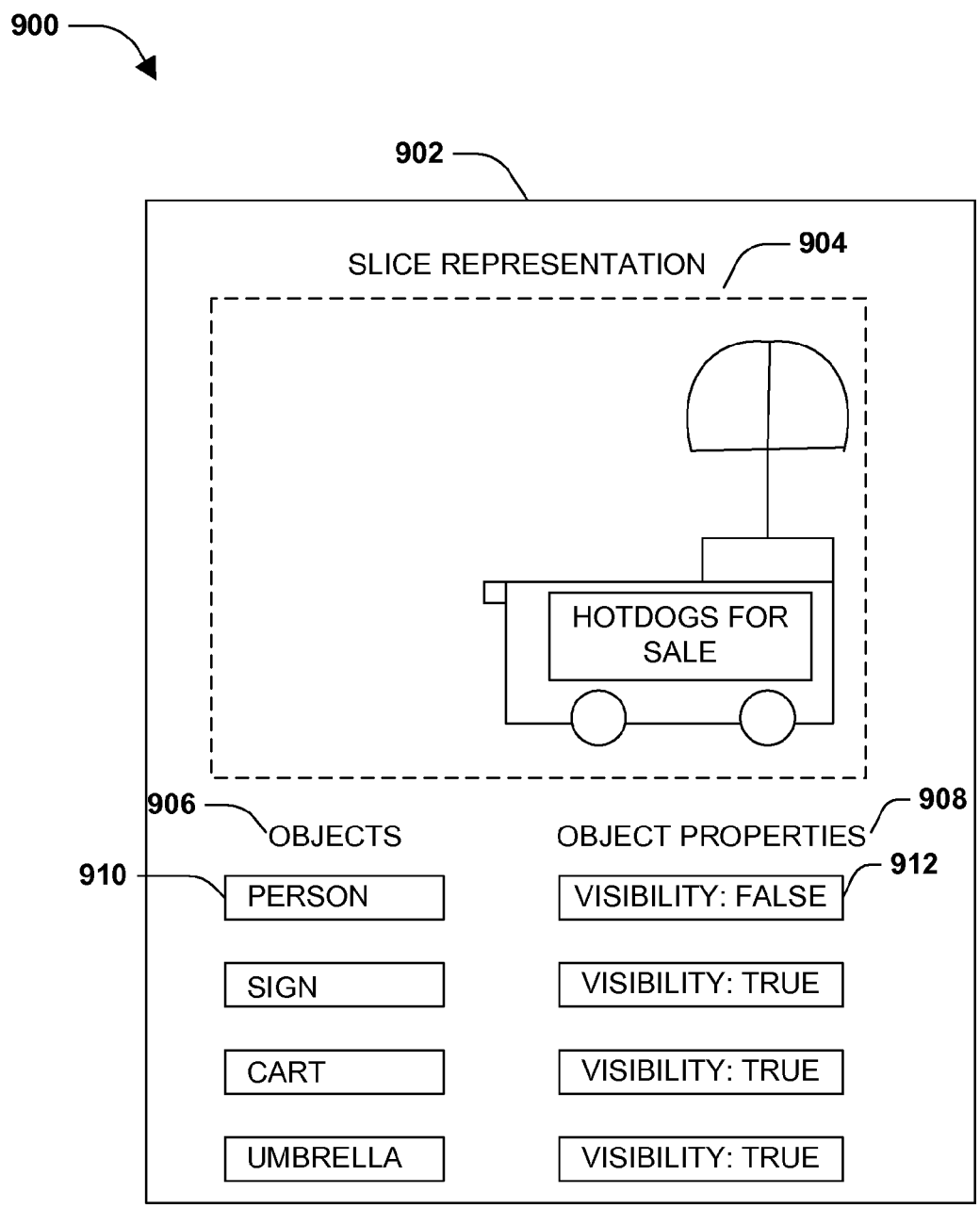
FIG. 9 is an illustration of an example of presenting a slice preview of a slice representation.

FIG. 9 illustrates an example 900 of presenting a slice preview 902 of a slice representation 904. The slice preview 902 may comprise the slice representation 904, a list of objects 906 within the slice representation 904, and a list of object properties 908. The slice representation 904 may comprise a slice region and a portion of an object within the slice region. The slice preview 902 may present a file size estimate based upon a file size estimate calculator. The slice representation 904 comprises a person object 910 (which is not visible). The person object 910 has a visibility object property 912 set to FALSE. The slice representation 904 does not display the person object 910 because the visibility property 912 is set to FALSE. Setting the visibility property 912 to FALSE may also set an inclusion property for the person object 910 to a value indicating that the person object 910 is not to be exported if an export file is created.

Figure 10:
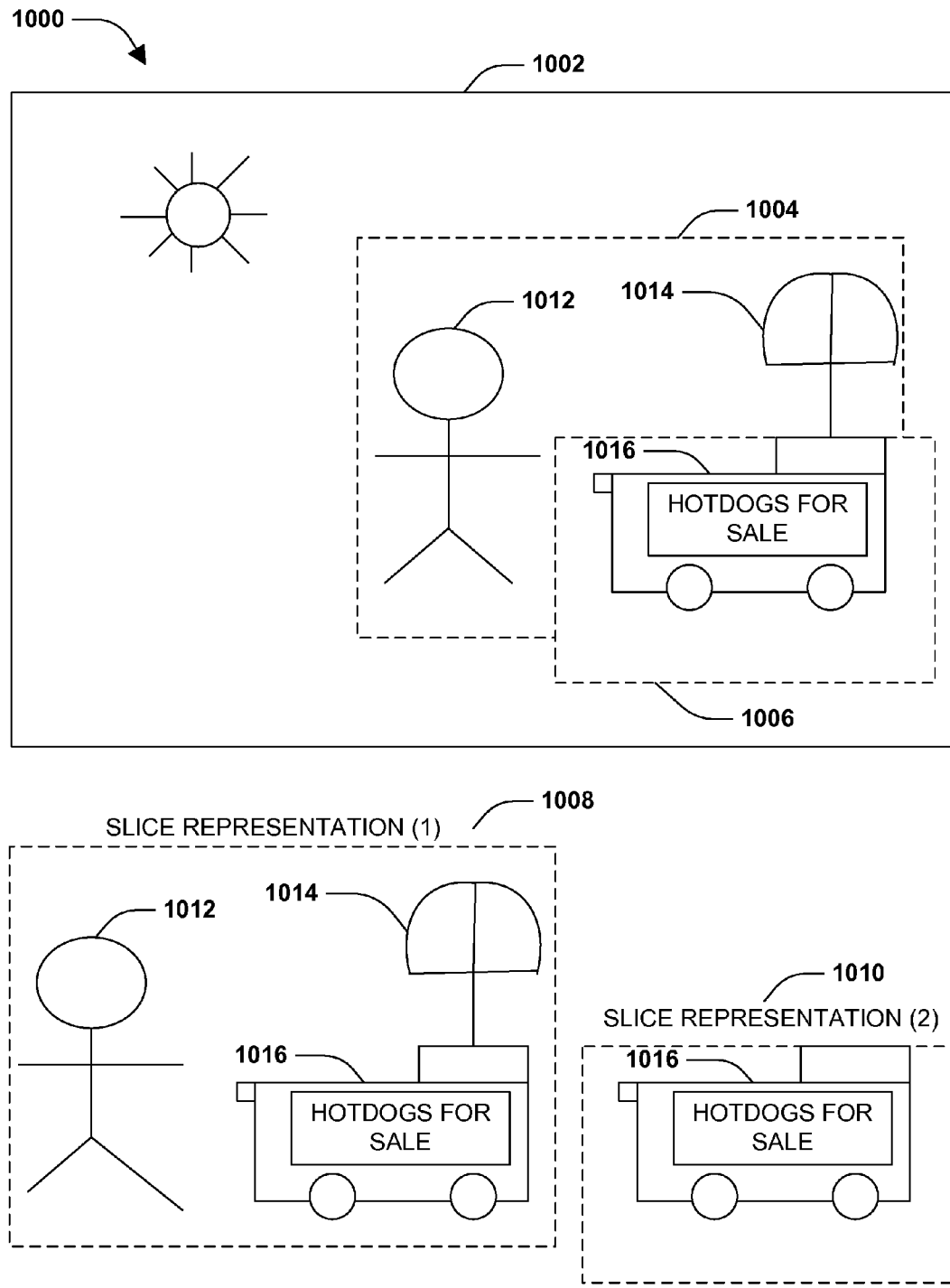
FIG. 10 is an illustration of an example of creating a slice representation of a visual composition.

FIG. 10 illustrates an example 1000 of creating a slice representation (1) 1008 and a slice representation (2) 1010 of a visual composition 1002. A user may define a first slice region 1004 by selecting a set of coordinates within the visual composition 1002. A person object 1012, an umbrella object 1014, and a hotdog stand object 1016 are at least partially within the first slice region 1004 of the visual composition 1002. The slice representation (1) 1008 is generated; comprising the first slice region 1004, the person object 1012, the umbrella object 1014, and the hotdog stand object 1016.

A second slice region 1006 may also be defined by selecting a second set of coordinates within the visual composition 1002. A plurality of slice representations may be defined by the user independent upon other slice regions and/or slice representations. The second slice region 1006 may be defined by any arbitrarily chosen set of coordinates. The second slice region 1006 is independent (e.g. may or may not have the same position and/or size; manipulation of objects and/or portions of objects within the slice region do not affect same objects and/or portions of objects within other slice regions and/or the original visual composition; etc.) of the first slice region 1004. The hotdog stand object 1016 is at least partially within the second slice region 1006 of the visual composition 1002.

The slice representation (2) 1010 is generated; comprising a second slice region 1006 and the hotdog stand object 1016. Any manipulations (e.g. slice operations) to objects or properties of objects within a slice representation do not affect the same objects within another slice representation or the original visual composition. For example, a user may invoke a slice operation that changes the visibility property of the hotdog stand object 1016 within the slice representation (1) 1008 to FALSE. The slice representation (1) will not display the hotdog stand object 1016. Slice representation (2) is unaffected by the slice operation. The hotdog stand object 1016 within slice representation (2) is still visible.

Figure 11:
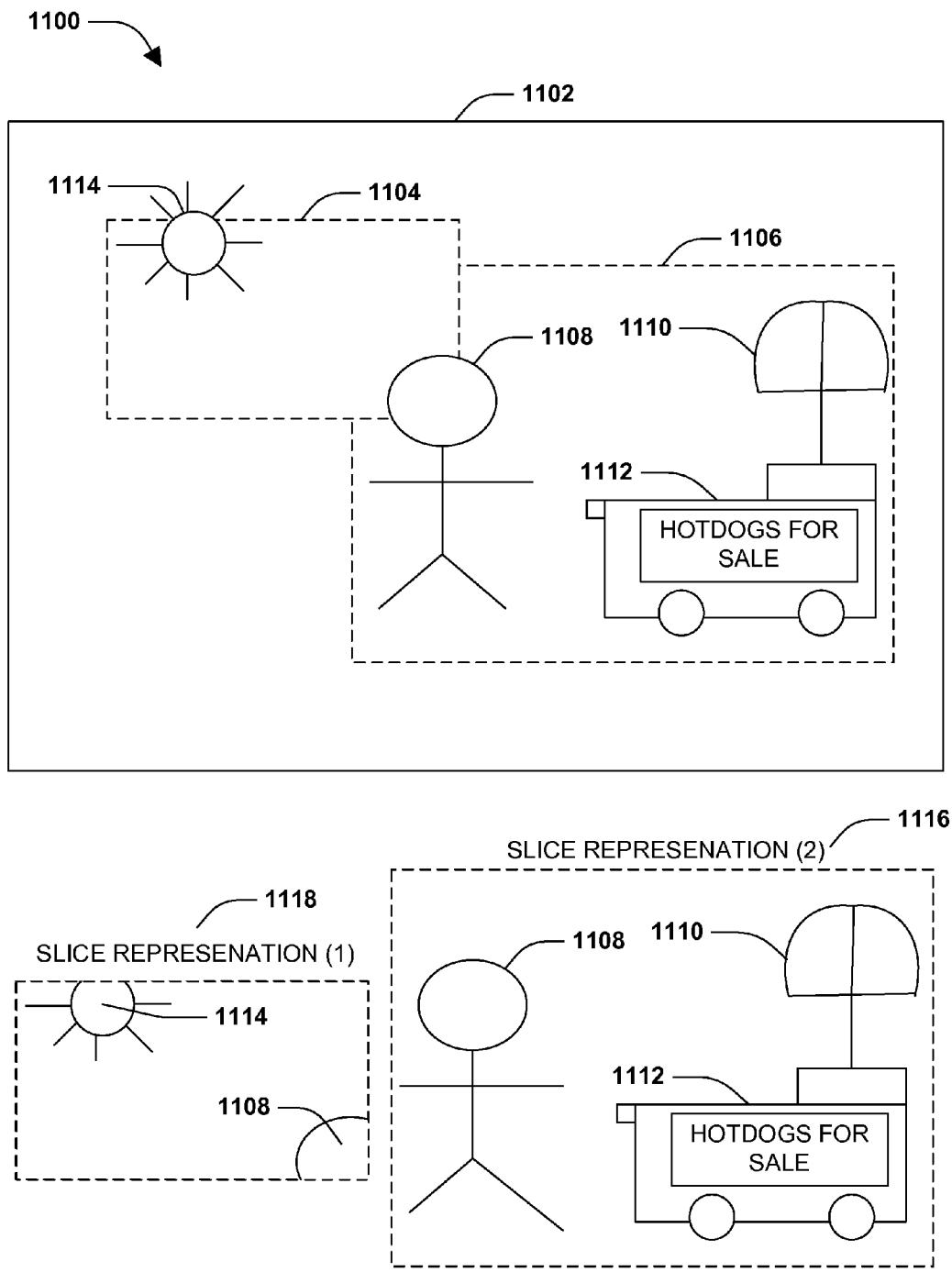
FIG. 11 is an illustration of an example of creating a slice representation of a visual composition.

FIG. 11 illustrates an example 1100 of creating a slice representation (1) 1118 and a slice representation (2) 1116 of a visual composition 1102. A user may define a first slice region 1104 by selecting a set of coordinates within the visual composition 1002. A sun object 1114 and a person object 1108 are at least partially within the first slice region 1104 of the visual composition 1102. The portion of the sun object 1114 and the person object 1108 that are not within the first slice region 1104 are clipped and excluded from the slice representation (1) 1118. The slice representation (1) 1118 is generated; comprising the first slice region 1104, the portion of the sun object 1114 that is within the first slice region 1104, and the portion of the person object 1108 that is within the first slice region 1104.

A second slice region 1106 may also be defined by selecting a second set of coordinates within the visual composition 1102. The set of coordinates defining the second slice region 1106 are independent of the first slice region 1104, slice representation (1) 1118, and/or the visual composition 1102. This allows the set of coordinates for the second slice region 1106 to be arbitrarily chosen, defining a location and/or size that is unaffected by other slice regions, slice representations, and/or the visual composition 1102. The person object 1108, the umbrella object 1110, and a hotdog stand object 1112 are at least partially within the second slice region 1106 of the visual composition 1102. The slice representation (2) 1116 is generated; comprising a second slice region 1106, the person object 1108, the umbrella object 1110, and the hotdog stand object 1112.

The slice representation (1) 1118 is defined by the first slice region 1104 that partially overlaps the second slice region 1106 of the slice representation (2) 1116. Slice regions may or may not overlap and/or abut other slice regions, and therefore, slice regions may have any configuration (e.g. position, size, etc.).

Figure 12:
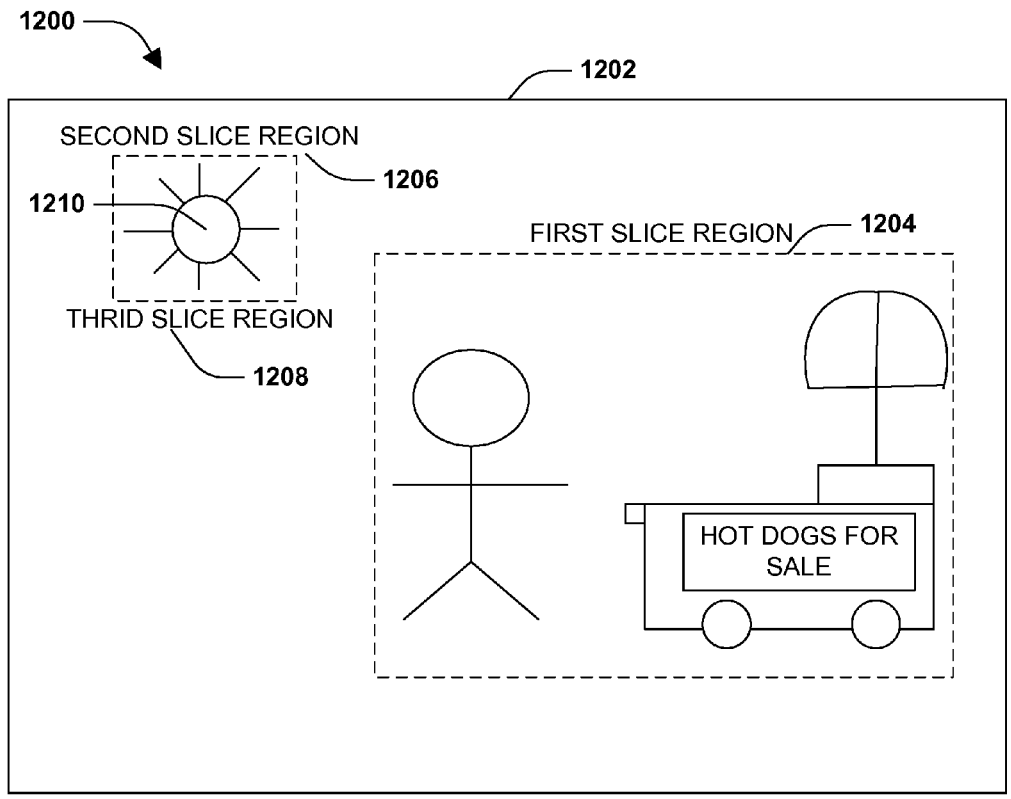
FIG. 12 is an illustration of an example of creating a slice representation of a visual composition.
Figure 12:
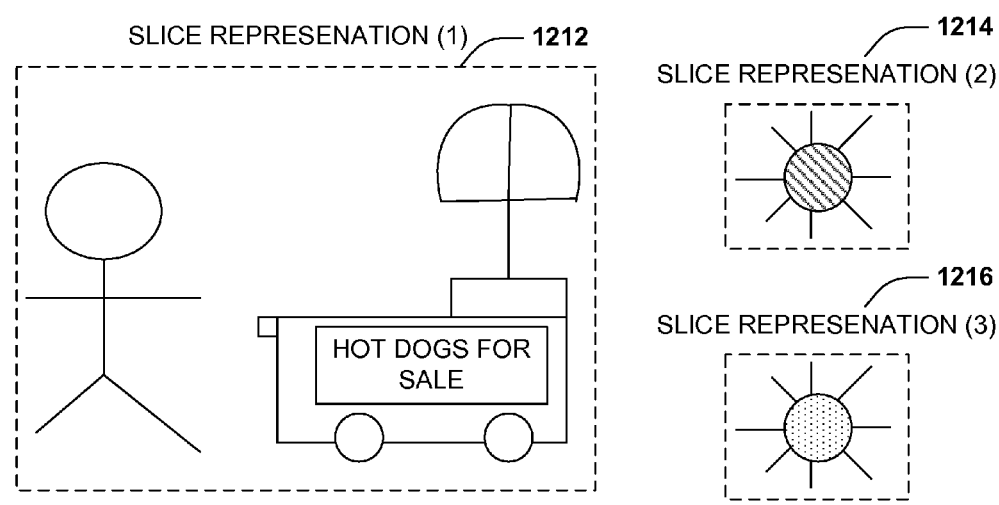

FIG. 12 illustrates an example 1200 of creating a slice representation (1) 1212, a slice representation (2) 1214, and a slice representation (3) 1216 of a visual composition 1202. The slice representation (1) 1212 comprises a first slice region 1204 and objects (person object, hotdog stand object, umbrella object) that are at least partially within the first slice region 1204. The slice representation (2) comprises a second slice region 1206 and a sun object 1210. The slice representation (3) comprises a third slice region 1208 and the sun object 1210.

The sun object 1210 within the slice representation (2) 1214 may be altered (e.g. a slice operation is performed) to have a striped fill pattern. This may be accomplished by a user changing the fill property of the sun object 1210 within the slice representation (2) 1214. The sun object 1210 within the slice representation (2) has the visual appearance (striped fill pattern) that reflects the slice operation. The slice operation does not affect the sun object 1210 within the visual composition 1202. The sun object 1210 within the visual composition 1202 still has a property of no fill.

The sun object 1210 within the slice representation (3) 1216 may also be altered (e.g. a slice operation is performed) to have a dotted fill pattern. This may be accomplished by a user changing the fill property of the sun object 1210 within the slice representation (3) 1216. The sun object 1210 within the slice representation (3) 1216 has the visual appearance (dotted fill pattern) that reflects the slice operation. The slice operation does not affect the sun object 1210 within the visual composition 1202. The sun object 1210 still has a property of no fill. The slice operation also does not affect the sun object 1210 within the slice representation (2) 1214. The sun object 1210 still has a property of a dotted fill pattern. This allows a user to create multiple overlapping slice representations. The slice representations may be used in a transparent and/or overlapping manner, such as, in a website where images within the same physical location change depending on an event. For example, a highlighted button is presented when the mouse is on top of the button and a non-highlighted button is presented when the mouse is not on top of the button. This is accomplished by overlapping two slice representations corresponding to a highlighted button and a non-highlighted button.

Figure 13:
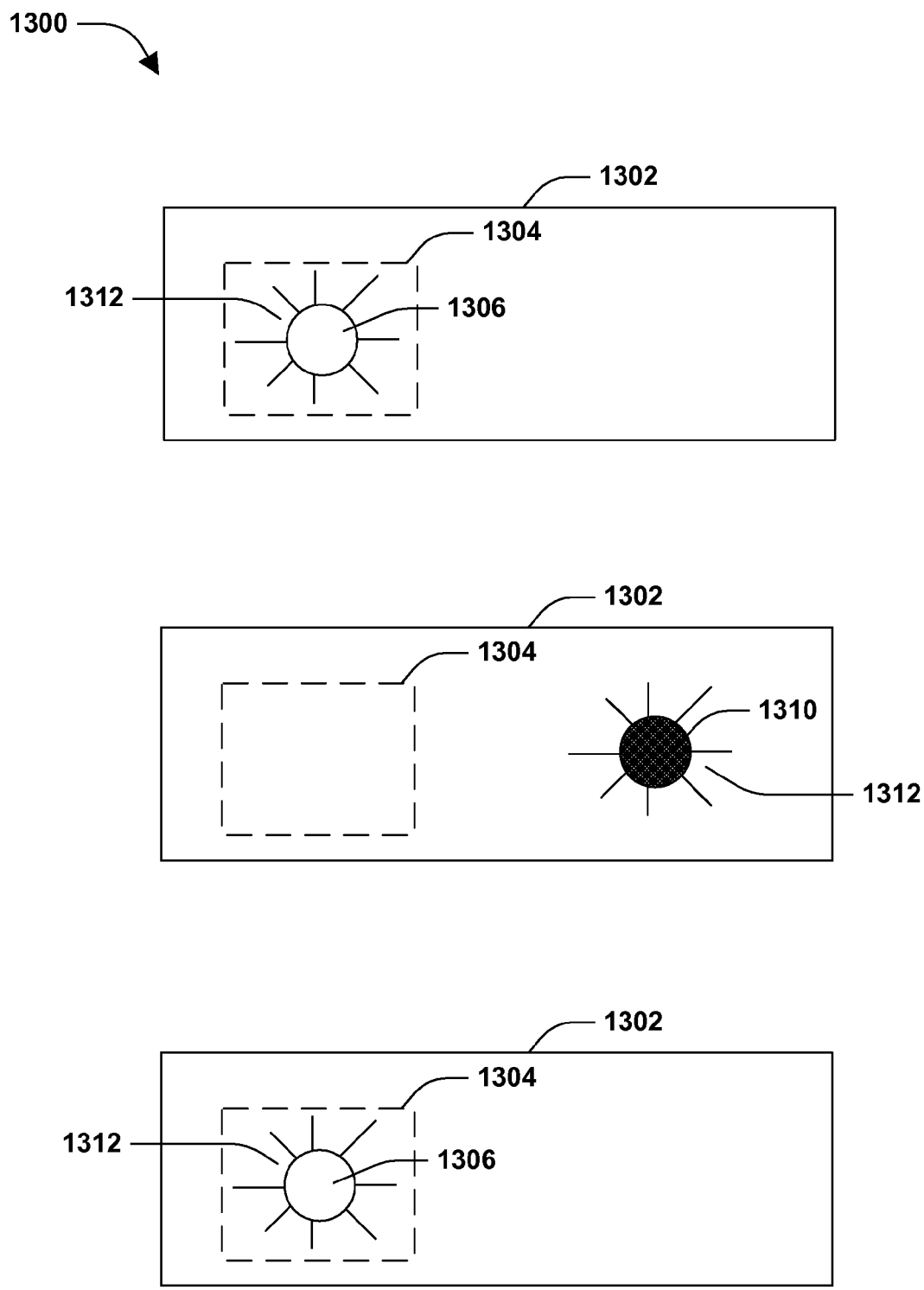
FIG. 13 is an illustration of an example of rendering an object within a visual composition according to an object slice history.

FIG. 13 illustrates an example 1300 of rendering an object within a visual composition 1302, according to an object slice history. The visual composition 1302 comprises a slice region 1304 and a sun object 1312. A slice operation is performed on the sun object 1312 to alter the fill property to a transparent fill property 1316. When the slice operation is performed, the object slice history is updated to reflect the slice operation. The object slice history may comprise properties, slice operations, object configuration, and/or any other information regarding a slice region, objects, and/or a slice representation.

The sun object 1312 may be removed from the slice region 1304, therefore, removing the sun object 1312 from a slice representation that may comprise the slice region 1304 and the sun object 1312. After the sun object 1312 is removed from the slice region 1304 to another position within the visual composition 1302, a slice operation is applied to the sun object 1312. The slice operation modifies the fill property of the sun object 1312 to a black fill property 1310. If the sun object 1312 is moved back into the slice region 1304, then the sun object 1312 will be rendered according to the slice object history. The sun object 1312 is rendered with the transparent fill property 1306 once the slice object history (e.g. slice operation) is applied to the sun object 1312. This allows the slice object history to retain and automatically track and apply slice operations that alter properties of objects. For example, a user would not have to remember whether an object was to be included (inclusion property setting) in the export file during exporting.

Figure 14:
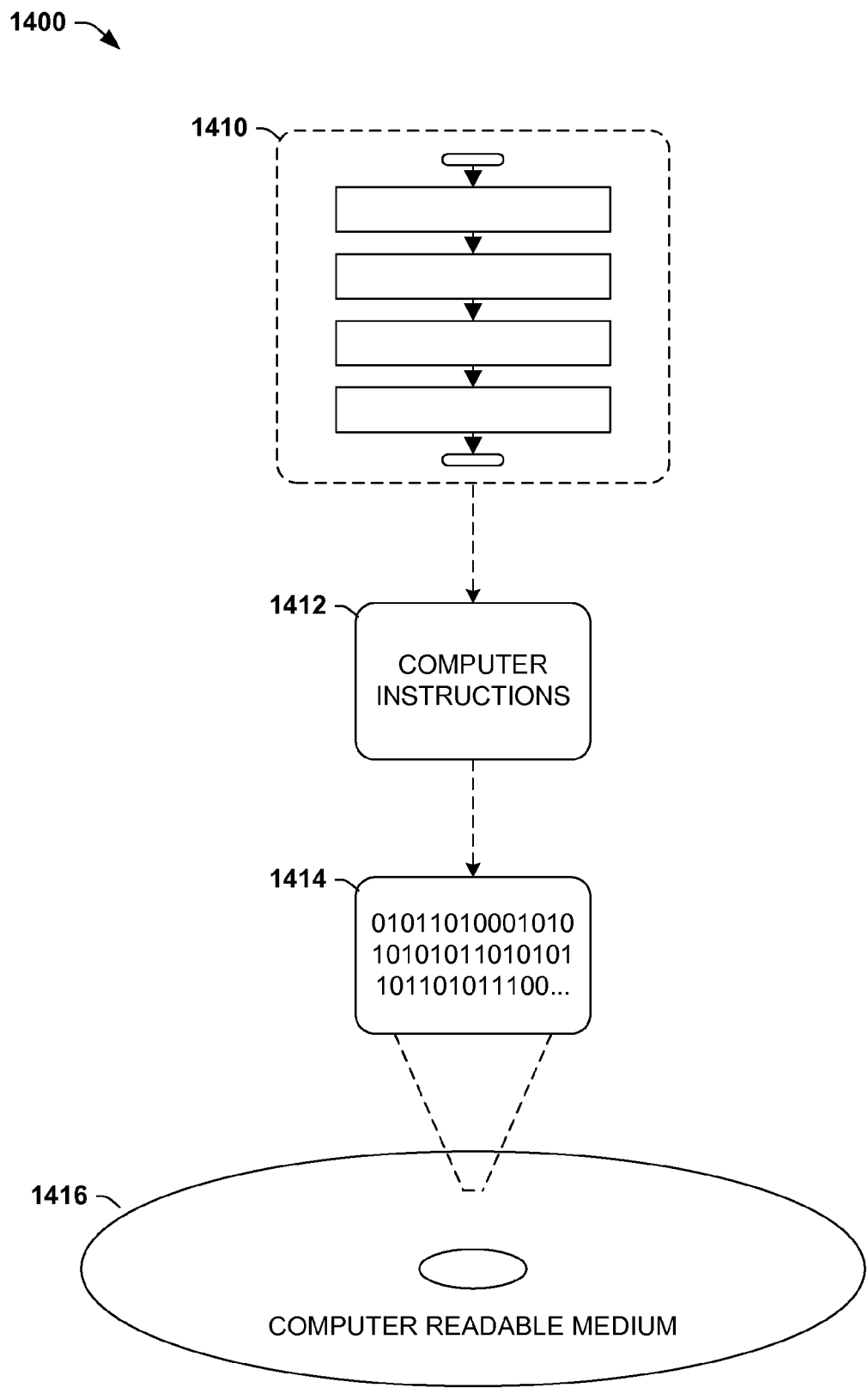
FIG. 14 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 14, wherein the implementation 1400 comprises a computer-readable medium 1416 (e.g., a CD-R, DVD-R, or a platter of a hard disk drive), on which is encoded computer-readable data 1410. This computer-readable data 1410 in turn comprises a set of computer instructions 1412 configured to operate according to one or more of the principles set forth herein. In one such embodiment 1400, the processor-executable instructions 1414 may be configured to perform a method, such as the exemplary method 200 of FIG. 2, for example. In another such embodiment, the processor-executable instructions 1414 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 15:
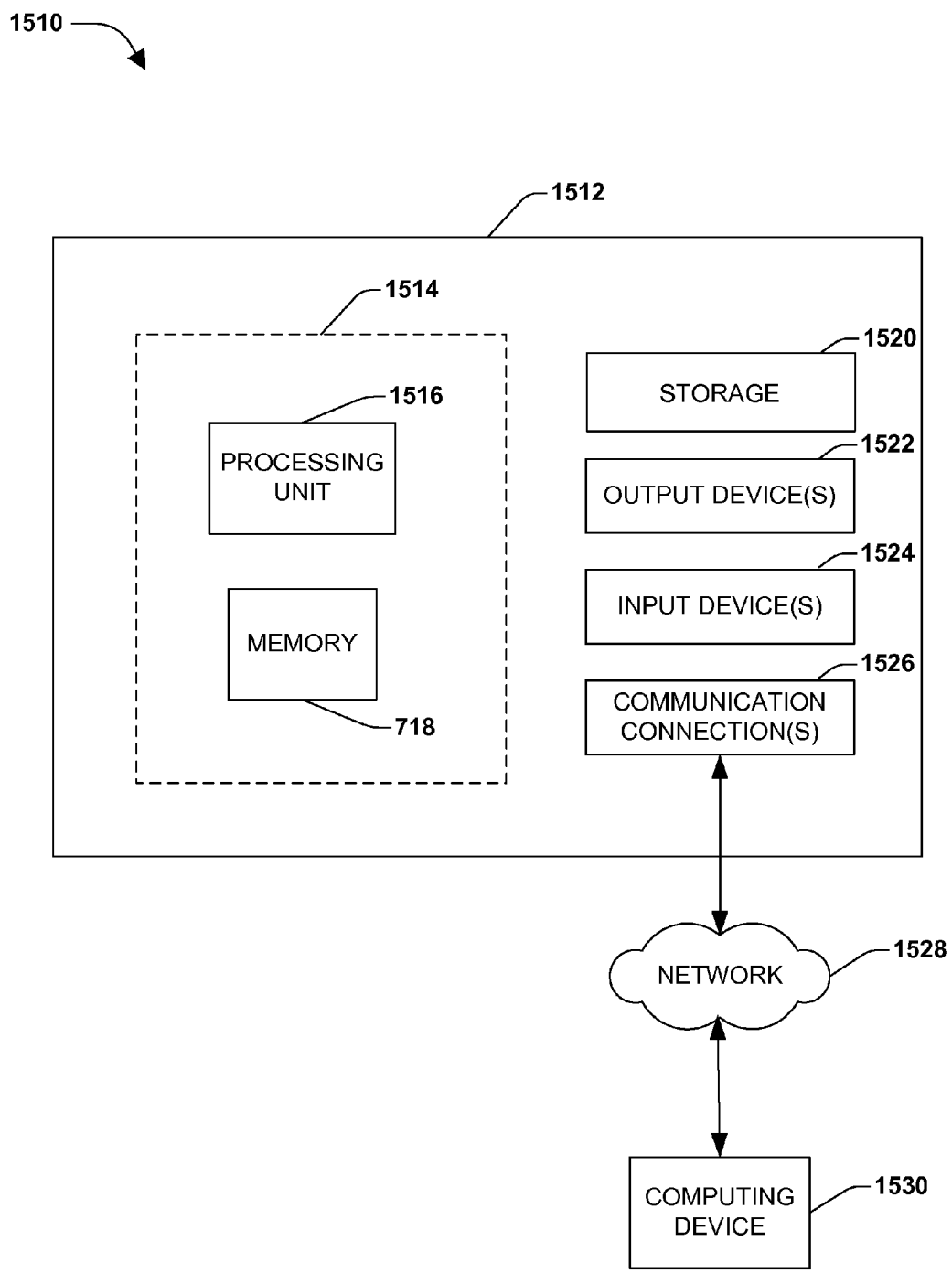
FIG. 15 illustrates an exemplary computing environment wherein one or more of the provisions set forth herein may be implemented.

FIG. 15 and the following discussion provide a brief, general description of a suitable computing environment to implement embodiments of one or more of the provisions set forth herein. The operating environment of FIG. 15 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 15 illustrates an example of a system 1510 comprising a computing device 1512 configured to implement one or more embodiments provided herein. In one configuration, computing device 1512 includes at least one processing unit 1516 and memory 1518. Depending on the exact configuration and type of computing device, memory 1518 may be volatile (such as RAM, for example), non-volatile (such as ROM, flash memory, etc., for example) or some combination of the two. This configuration is illustrated in FIG. 15 by dashed line 1514.

In other embodiments, device 1512 may include additional features and/or functionality. For example, device 1512 may also include additional storage (e.g., removable and/or non-removable) including, but not limited to, magnetic storage, optical storage, and the like. Such additional storage is illustrated in FIG. 15 by storage 1520. In one embodiment, computer readable instructions to implement one or more embodiments provided herein may be in storage 1520. Storage 1520 may also store other computer readable instructions to implement an operating system, an application program, and the like. Computer readable instructions may be loaded in memory 1518 for execution by processing unit 1516, for example.

The term "computer readable media" as used herein includes computer storage media. Computer storage media includes volatile and nonvolatile, removable and non-removable media implemented in any method or technology for storage of information such as computer readable instructions or other data. Memory 1518 and storage 1520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1512. Any such computer storage media may be part of device 1512.

Device 1512 may also include communication connection(s) 1526 that allows device 1512 to communicate with other devices. Communication connection(s) 1526 may include, but is not limited to, a modem, a Network Interface Card (NIC), an integrated network interface, a radio frequency transmitter/receiver, an infrared port, a USB connection, or other interfaces for connecting computing device 1512 to other computing devices. Communication connection(s) 1526 may include a wired connection or a wireless connection. Communication connection(s) 1526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1512 may include input device(s) 1524 such as keyboard, mouse, pen, voice input device, touch input device, infrared cameras, video input devices, and/or any other input device. Output device(s) 1522 such as one or more displays, speakers, printers, and/or any other output device may also be included in device 1512. Input device(s) 1524 and output device(s) 1522 may be connected to device 1512 via a wired connection, wireless connection, or any combination thereof. In one embodiment, an input device or an output device from another computing device may be used as input device(s) 1524 or output device(s) 1522 for computing device 1512.

Components of computing device 1512 may be connected by various interconnects, such as a bus. Such interconnects may include a Peripheral Component Interconnect (PCI), such as PCI Express, a Universal Serial Bus (USB), firewire (IEEE 1394), an optical bus structure, and the like.

In another embodiment, components of computing device 1512 may be interconnected by a network. For example, memory 1518 may be comprised of multiple physical memory units located in different physical locations interconnected by a network.

Those skilled in the art will realize that storage devices utilized to store computer readable instructions may be distributed across a network. For example, a computing device 1530 accessible via network 1528 may store computer readable instructions to implement one or more embodiments provided herein. Computing device 1512 may access computing device 1530 and download a part or all of the computer readable instructions for execution. Alternatively, computing device 1512 may download pieces of the computer readable instructions, as needed, or some instructions may be executed at computing device 1512 and some at computing device 1530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for creating slice representations of a visual composition comprising:
   utilizing a computing device to perform at least some of the following:
   generating a first slice representation comprising a first slice region and a first portion of a first object within the first slice region based upon a first set of arbitrarily chosen coordinates defining the first slice region of a visual composition; and
   generating a second slice representation comprising a second slice region and a second portion of a second object within the second slice region based upon a second set of arbitrarily chosen coordinates defining the second slice region of the visual composition, the second slice region overlapping at least some but not all of the first slice region.

2. The method of claim 1, the first object different than the second object.

3. The method of claim 1, the first object the same as the second object, and the first portion of the first object different than the second portion of the second object.

4. The method of claim 1, the first object the same as the second object, and the first portion of the first object the same as the second portion of the second object.

5. The method of claim 1, comprising:
   upon receiving a slice operation, applying the slice operation to the first slice representation.

6. The method of claim 5, comprising:
   refraining from applying the slice operation to the second slice representation.

7. The method of claim 5, comprising:
   refraining from applying the slice operation to the visual composition.

8. The method of claim 5, the slice operation comprising at least one of:
   modifying one or more coordinates of the first slice region;
   removing one or more objects from the first slice region;
   adding one or more objects to the first slice region;
   modifying a property of an object within the first slice region;
   modifying an inclusion property of an object within the first slice region; and
   modifying a visibility property of an object within the first slice region.

9. The method of claim 1, comprising:
   defining an object slice history for the first portion of the first object based upon one or more slice operations applied to the first portion of the first object.

10. The method of claim 9, comprising:
    updating the object slice history based upon applying a slice operation to the first portion of the first object.

11. The method of claim 9, comprising:
    detecting a removal of the first portion of the first object from the first slice representation; and
    retaining the object slice history for the first portion of the first object.

12. The method of claim 11, comprising:
upon detecting a re-addition of the first portion of the first object to the first slice representation, applying the object slice history to the first portion of the first object.

13. The method of claim 12, the applying the object slice history comprising:
modifying a property of the first portion of the first object based upon a prior slice operation specified within the object slice history.

14. The method of claim 1, at least one of the first slice region and the second slice region comprising a non-rectangular polygonal region.

15. The method of claim 1, comprising:
generating a slice export file based upon the first slice representation as at least one of an image output, a vector based output, a text output, and a video output based upon an inclusion property assigned to the first portion of the first object.

16. A system for creating slice representations of a visual composition comprising:
one or more processors configured to implement at least some of the following:
a slice generating component configured to:
generate a first slice representation comprising a first slice region and a first portion of a first object within the first slice region based upon a first set of arbitrarily chosen coordinates defining the first slice region of a visual composition; and
generate a second slice representation comprising a second slice region and a second portion of a second object within the second slice region based upon a second set of arbitrarily chosen coordinates defining the second slice region of the visual composition, the second slice region overlapping at least some but not all of the first slice region.

17. The system of claim 16, comprising:
a history component configured to:
define an object slice history for the first portion of the first object based upon one or more slice operations applied to the first portion of the first object; and
update the object slice history based upon applying a slice operation to the first portion of the first object.

18. The system of claim 17, the history component configured to:
detect a removal of the first portion of the first object from the first slice representation; and
retain the object slice history for the first portion of the first object.

19. The system of claim 17, the history component configured to:
upon detecting a re-addition of the first portion of the first object to the first slice representation, apply the object slice history to the first portion of the first object.

20. A computer readable memory comprising computer executable instructions that when executed via a processor perform a method for creating slice representations of a visual composition, comprising:
generating a first slice representation comprising a first slice region and a first portion of a first object within the first slice region based upon a first set of arbitrarily chosen coordinates defining the first slice region of a visual composition; and
generating a second slice representation comprising a second slice region and a second portion of a second object within the second slice region based upon a second set of arbitrarily chosen coordinates defining the second slice region of the visual composition, the second slice region overlapping at least some but not all of the first slice region, at least one of the first slice region and the second slice region comprising a non-rectangular polygonal region.

* * * * *

UNITED STATES PATENT AND TRADEMARK OFFICE
CERTIFICATE OF CORRECTION

PATENT NO. : 8,160,389 B2  Page 1 of 1
APPLICATION NO. : 12/179575
DATED : April 17, 2012
INVENTOR(S) : Bissonnette et al.

It is certified that error appears in the above-identified patent and that said Letters Patent is hereby corrected as shown below:

In the Claims

In column 15, line 5, In Claim 13, after "12," delete "the".

Signed and Sealed this
Third Day of February, 2015

Michelle K. Lee
*Deputy Director of the United States Patent and Trademark Office*